US011451538B2

(12) United States Patent
Chellappan et al.

(10) Patent No.: US 11,451,538 B2
(45) Date of Patent: Sep. 20, 2022

(54) METHODS AND SYSTEMS OF AUTHENTICATING OF PERSONAL COMMUNICATIONS

(71) Applicant: University of South Florida, Tampa, FL (US)

(72) Inventors: Sriram Chellappan, Tampa, FL (US); Balaji Padmanabhan, Tampa, FL (US); Tanvir Hossain Bhuiyan, Tampa, FL (US); Arup Kanti Dey, Tampa, FL (US); Shaminur Rahman, Tampa, FL (US)

(73) Assignee: University of South Florida, Tampa, FL (US)

( * ) Notice: Subject to any disclaimer, the term of this patent is extended or adjusted under 35 U.S.C. 154(b) by 88 days.

(21) Appl. No.: 16/841,619

(22) Filed: Apr. 6, 2020

(65) Prior Publication Data

US 2020/0322331 A1 Oct. 8, 2020

Related U.S. Application Data

(60) Provisional application No. 62/830,289, filed on Apr. 5, 2019.

(51) Int. Cl.
*H04L 29/06* (2006.01)
*H04L 9/32* (2006.01)
(Continued)

(52) U.S. Cl.
CPC ........ *H04L 63/0861* (2013.01); *H04L 9/0643* (2013.01); *H04L 9/0866* (2013.01);
(Continued)

(58) Field of Classification Search
CPC ..... H04W 4/029; H04W 12/63; H04W 12/61; H04W 12/06; H04L 9/0866;
(Continued)

(56) References Cited

U.S. PATENT DOCUMENTS 7,698,566 B1 * 4/2010 Stone .................. H04L 63/08
713/186
8,090,351 B2 1/2012 Klein
(Continued)

FOREIGN PATENT DOCUMENTS

EP 2908454 8/2015

*Primary Examiner* — Mohammad A Siddiqi
(74) *Attorney, Agent, or Firm* — Meunier Carlin & Curfman LLC

(57) ABSTRACT

A system for authenticating an individual's location activity includes a mobile communications device connected to a network and in electronic communication with at least one other computer. The mobile communications device is configured to authenticate the individual's presence at a location using biometric data entered by the individual. The mobile communications device has applications stored thereon to access location information for the mobile communications device using a GPS application stored on the mobile communications device and to access time information for the mobile communications device from a clock application stored on the mobile communications device. The mobile communications devices creates a digital signature that authenticates an individual's location activity by storing an encrypted digital certificate comprising a hash calculation using the biometric data, a validation key generated by authenticating the biometric data, the location information, and the time information.

8 Claims, 7 Drawing Sheets

(51) Int. Cl.
*H04L 9/08* (2006.01)
*H04L 9/06* (2006.01)
*H04W 12/06* (2021.01)
*H04W 4/029* (2018.01)
*H04L 9/40* (2022.01)

(52) U.S. Cl.
CPC ........ H04L 9/3247 (2013.01); H04L 63/0823 (2013.01); H04W 4/029 (2018.02); H04W 12/06 (2013.01)

(58) Field of Classification Search
CPC . H04L 63/0823; H04L 9/0643; H04L 9/3247; H04L 9/3231; H04L 63/0861
See application file for complete search history.

(56) References Cited

U.S. PATENT DOCUMENTS

| | | |
|---|---|---|
| 8,718,673 B2 | 5/2014 | Harper |
| 8,922,427 B2 | 12/2014 | Dehnie et al. |
| 9,119,068 B1 | 8/2015 | Hubble |
| 9,642,005 B2 * | 5/2017 | Fosmark ............ G06Q 20/3223 |
| 10,771,898 B2 * | 9/2020 | Dusan .................... H04W 4/02 |
| 2008/0080484 A1 * | 4/2008 | Hughes ............... H04M 3/2236 370/352 |
| 2013/0117822 A1 * | 5/2013 | Soulez ................ G06Q 20/425 726/4 |
| 2015/0128240 A1 * | 5/2015 | Richards ............ H04L 63/0861 726/7 |
| 2018/0160907 A1 * | 6/2018 | Verma .................. A61B 5/6898 |
| 2018/0241558 A1 * | 8/2018 | Takahashi ............ H04L 9/3231 |
| 2019/0028851 A1 * | 1/2019 | Hansen .................. G06F 21/32 |
| 2019/0104121 A1 * | 4/2019 | Khandani ............. H04L 9/0858 |

* cited by examiner

300

400

500

600

700

800

METHODS AND SYSTEMS OF AUTHENTICATING OF PERSONAL COMMUNICATIONS

CROSS REFERENCE TO RELATED APPLICATIONS

This application claims priority to and incorporates entirely by reference U.S. Provisional Patent Application Ser. No. 62/830,289 filed on Apr. 5, 2019, and entitled Systems and Methods for Authenticating of Personal Communications.

FIELD

This disclosure relates to the field of authenticating a physical presence of a personal communications device along with an identifiable user at a given location at a particular time.

BACKGROUND

Individuals and groups of individuals are more mobile now than ever before, and personal communications devices are typically "on-the-go" with their respective users. Modern advances in the fields of GPS applications and mapping software that are commonly installed on mobile electronic devices, as well as other kinds of monitoring software installed on those devices, provide up to date tracking capabilities for a given device.

Although a device can be tracked with a significant degree of certainty due to the nature of telecommunications handshaking operations with cellular and wired networks, confirming an identity of a person operating the device during that tracking has been more difficult, especially after a given period of use has passed. Authenticating the fact that an individual or certain machines, such as vehicles, under direct control of a particular individual are currently or have previously been the true users of a respective device has been a difficult pairing to achieve in an authentication context.

Many times, individuals have to prove an identity of an individual, use of a computerized device and a location of where the person was located at the same time. Currently, there are no techniques to do that with proven unforgeability. There are many problems in which a person's exact location at a specific point in time needs to be authenticated. This disclosure addresses a need in the art of authenticating human behavior that occurred at a particular time, a particular location, and with a particular device.

SUMMARY

This disclosure provides systems and methods by which a particular individual can prove with a great degree of certainty that the individual has been at a location at a particular time with a particular communications device in use. The disclosure embodies the concept of combining location information obtained from a mobile personal communications device with a method for authentication that relies on individual biometrics, specifically voice (or even video) in this case. This unique combination of using voice and location in a specific manner for authentication has several modes in which it can be used to address many significant real-world problems.

In one embodiment, the disclosure is implemented as an interactive software application, referred to in common parlance as an "app," on user phones combined with software that resides on the cloud in servers. Typically, at the time of authentication the server sends a unique message to the client (the app on the mobile device) that a user is using to authenticate. The user would then have to either read the sentence that appears on a screen associated with the mobile device, or answer a question that is audibly asked via the mobile device. The response, in the form of an audio (or video) file, the time/date information and the location provided by a GPS application on the phone are then combined to create a hash which is then digitally signed and stored on either the phone, on a server in the cloud, or both. Subsequently this signature can be used both by the user directly, or by a third party, to authenticate the user's location at a specific point in time. Note that if users attempt to spoof GPS locations on the phone, even those can be detected in the software of this system, such that the system can either refuse to provide authentication services, or provide authentication with a caveat that GPS was spoofed (both have their own application scenarios).

This disclosure integrates location (after checking for spoofing), voice and the use of environmental sounds, voices, and/or ambience into methods and systems for authenticating a user's identity and location with a mobile communications device, such as a cellular telephone. The authentication methods herein are used along with machine learning techniques (to combat fraud) and digital signatures (for provability at any later point in time). In one embodiment, the entire system operates as a smart-phone app. With suitable adaptations it can be applied, without limiting this disclosure, to many scenarios including generation of alibis; proving location integrity for law-enforcement officers or employees or test-takers; digital evidence under assault; and parents locating their children at any time etc.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

DETAILED DESCRIPTION

Figure 1:
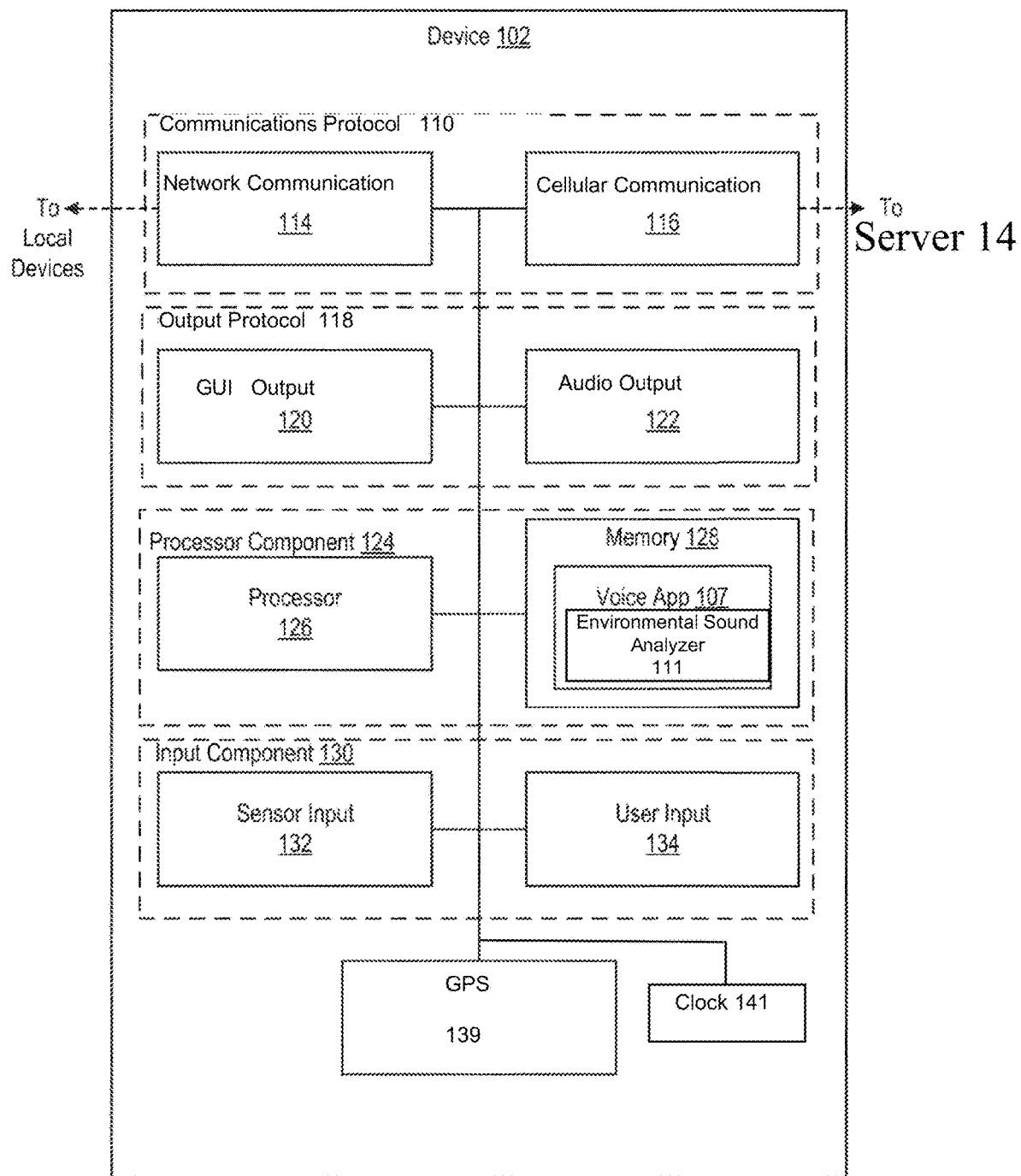
FIG. 1 is a schematic representation of a mobile personal communications device and computerized components therein that are configured to implement the methods and systems of this disclosure.

The following description of the disclosure is provided as an enabling teaching of the disclosure in its best, currently known embodiment(s). To this end, those skilled in the relevant art will recognize and appreciate that many changes can be made to the various embodiments of the embodiments described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this disclosure belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically by reference in their entireties and at least for the material for which they are cited.

Authentication is vital for many applications involving sensitive and even confidential personal information. Many electronic communication devices include digital signatures that offer scalable authentication with non-repudiation (i.e., no deniability of any verifier) and public verifiability, which are necessary for auditing and dispute resolution in certain communication system records. However, digital signatures and other kinds of authentication services have not been able to incorporate any proof that a particular individual operated a particular device at a particular time in a particular location.

Design objectives for this disclosure optionally include some or all of the resource considerations explained below, but these objectives are not considered to be limiting or exclusive requirements in any way:

(i) In one non-limiting embodiment, a user downloads an application having graphical user interfaces shown in FIGS. 3-7 and uses it to authenticate themselves (i.e. "solo mode").

Figure 3:
FIG. 3 is a schematic illustration of a display screen of a mobile electronic device allowing a user to register for the authentication method and system disclosed herein.
Figure 4:
FIG. 4 is a schematic illustration of an application interface displayed on a GUI of a mobile electronic device allowing a user to register for the authentication method and system disclosed herein in the context of a parent and child relationship.
Figure 5:
FIG. 5 is a schematic illustration of an application interface displayed on a GUI of a mobile electronic device allowing a user to register for the authentication method and system disclosed herein in the context of a parent and child relationship.
Figure 5:
Figure 6:
FIG. 6 is a schematic illustration of a display screen of a mobile electronic device accessing a menu of options for the authentication system and methods disclosed herein.
Figure 10:
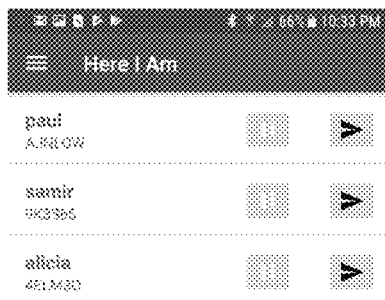
FIG. 10 is a schematic illustration of a display screen of a mobile electronic device showing details of a selection of individuals that a remote device has authority to request authentication as described herein.
Figure 11:
FIG. 11 is a schematic illustration of a display screen of a mobile electronic device showing details of an example sentence that may be a part of an authentication procedure as described herein.

(ii) In another non-limiting embodiment, the software keeps track of users and their relationships, where some users are coded as "parents" as in FIG. 5 while others are coded as "children" in FIGS. 3 and 4, with a many-to-many mapping between parents and children as illustrated in FIGS. 6 and 10.

Figure 7:
FIG. 7 is a schematic illustration of a display screen of a mobile electronic device showing a list of previously authenticated locations in which an individual has used the respective mobile communications device.
Figure 8:
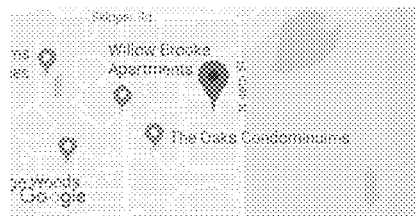
FIG. 8 is a schematic illustration of a display screen of a mobile electronic device showing details of a particular location after authorization with an authentication certificate as described herein.

(iii) In another non-limiting embodiment, a user may want to authenticate not just his or her location as shown in FIGS. 7 and 8, but the environment around that person which can include objective physical landmarks but also subjective descriptions by the user.

Exemplary embodiments may include program products comprising computer or machine-readable media for carrying or having machine-executable instructions or data structures stored thereon. For example, the apps, the software, and all of the methods implemented herein may be computer driven. Exemplary embodiments illustrated in the methods of the figures may be controlled by computer program products that utilize computer or machine-readable media for carrying or having machine-executable instructions or data structures and software stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general-purpose computer, special purpose computer, or special purpose processing machines to perform a certain function or group of functions. Software implementations of the present disclosure could be accomplished with standard programming techniques with rule-based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the embodiments claimed herein.

FIG. 1 shows an exemplary computing environment in which example embodiments and aspects may be implemented. The computing device environment is only one example of a suitable computing environment and is not intended to suggest any limitation as to the scope of use or functionality. FIG. 1 shows that a computerized mobile device may have a network communication interface 114, cellular communication interface 116, numerous graphical user interfaces 120 selectable by screens, and the communications protocol 110 includes audio output 122 and/or video output. The processing system component 124 has a processor 126, memory, 128, a voice application for storing voice data 107, and other sound analysis software such as an environmental sound analyzer 111. The mobile device shown in FIG. 1 also has communications access to servers 14.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With further reference to FIG. 1, an exemplary system for implementing aspects described herein includes a computing device, such as computing device 102. In its most basic configuration, computing device 102 typically includes at least one processing unit 126 and memory 128. Depending on the exact configuration and type of computing device, memory may be volatile (such as random-access memory (RAM)), non-volatile (such as read-only memory (ROM), flash memory, etc.), or some combination of the two.

Computing device 102 may have additional features/functionality. For example, computing device 102 may include additional storage (removable and/or non-removable) including, but not limited to, magnetic or optical disks or tape.

Computing devices typically include a variety of computer readable media. Computer readable media can be any available media that can be accessed by the device 102 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 102. Any such computer storage media may be part of computing device 102.

Computing device 102 may contain communication connection(s) 110 that allow the device to communicate with other devices. Computing device 102 may also have input device(s) 130, 132, 134 such as a keyboard, mouse, pen, voice input device, touch input device, etc. Output device(s) such as a display, speakers, printer, etc. may also be included. All these devices are well known in the art and need not be discussed at length here. For purposes herein, the computing devices of this disclosure typically include a clock 141 and a GPS or mapping system 139.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Figure 2:
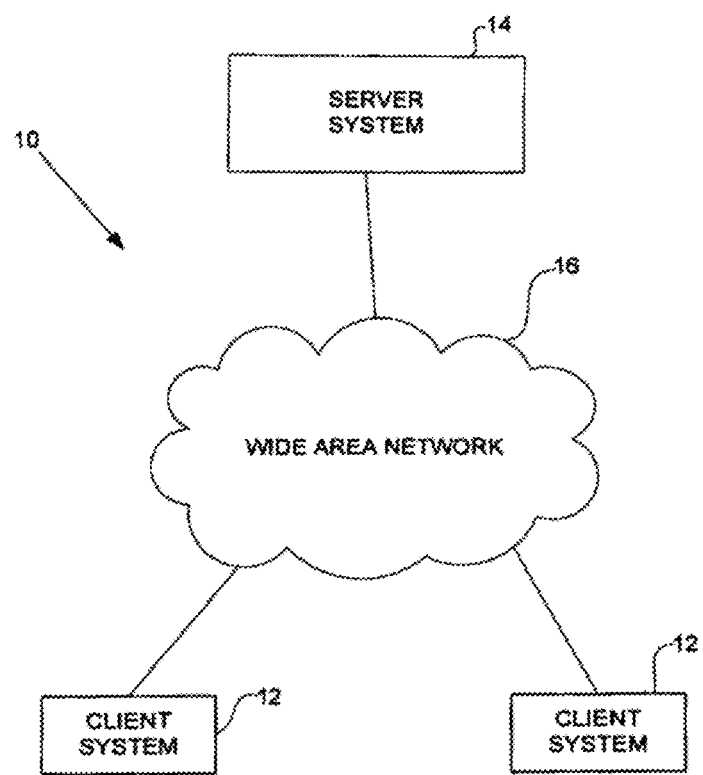
FIG. 2 is a schematic representation of a communications network by which the mobile device of FIG. 1 accesses remote devices on different networks.

Although exemplary implementations may refer to utilizing aspects of the presently disclosed subject matter in the context of one or more stand-alone computer systems, the subject matter is not so limited, but rather may be implemented in connection with any computing environment, such as a network 16 shown in FIG. 2 or other distributed computing environments. Still further, aspects of the presently disclosed subject matter may be implemented in or across a plurality of processing chips or devices, and storage may similarly be effected across a plurality of devices. Such devices might include personal computers, network servers, and handheld devices, for example.

There are currently three modes of operations for this invention: (a) Solo, (b) Parent-Child architecture and (c) Ambient authentication. Details and examples are provided below.

FIG. 2 illustrates a communications network 10 in which a client system 12, such as a mobile electronic device connects to at least one server 14 over a network 16. The server system 14 may incorporate cloud-based computing to perform certain operations described below. For example, a voice analysis software system may be accessed remotely from a client system requesting voice verification for an individual using the mobile device.

Device 102 may include any one of a number of know mobile devices such as a a cell phone with a processor as shown, other smart devices, and other Wi-Fi and/or cellular enable mobile personal communication devices, such as laptops, tablets and the like. Internally, such mobile devices include hardware and software (e.g., iOS, Android, Windows Phone, Blackberry, etc.) that can run the applications described herein, including the voice authentication application 107 and corresponding software to run an environmental sound analyzer (ambience analysis described below).

(a) Solo Mode.

Figure 9:
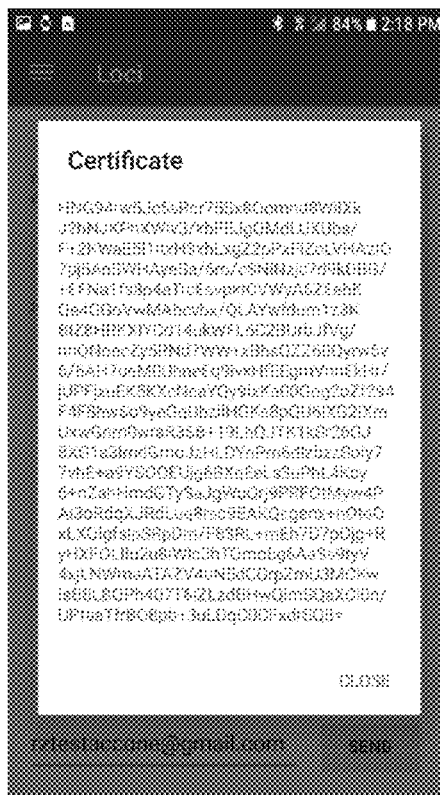
FIG. 9 is a schematic illustration of a display screen of a mobile electronic device showing details of a particular authentication certificate for a user, a location and a time stamp as described herein.

In this mode, a user downloads the app and uses it to authenticate himself or herself. The user logs into the app 300 illustrated in FIGS. 3-6, selects an option to self-authenticate, and is then sent a message from the server 14 to narrate into the phone. The content may be a code 400 as shown in FIG. 4. Once the user completes this by entering the code at API 500 shown in FIG. 5, the voice data stored in voice processing software 107, time from clock 141 and location information 700, 800, 1100 (FIGS. 7, 8, and 10) are hashed, signed and stored. The resulting digital certificate 900 is shown in FIG. 9. The user can then authenticate to a third party her location at the point in time when the authentication was done. Multiple parties may be required to authenticate as a group as shown in FIG. 10 at Ref. 1000.

In addition to authentication, in solo mode the application may then trigger business rules that complete other functionalities that add value in different applications. Below are some examples where this mode can be used commercially and socially.

Solo-Example-1: In "alibi" mode, this app can be used to provide an alibi for a user. Certain individuals from poorer socio-economic demographics have in the past struggled with law enforcement, where primarily the issue is not having an alibi when some crime may have been committed. This app provides a mechanism for doing so.

Beyond crime, the "alibi" mode can be used by individuals to prove they were (or were NOT) at a certain location at a certain point in time. Below are some possible use-cases where this is important.

Solo-Example-2: Homeowners routinely have services such as lawn-mowing or pool-maintenance which is outsourced to agencies that have to do regular service. While the lawn can be visually inspected perhaps, it may be hard to visually inspect a pool to ensure that it was treated. The app can be used by these agencies to authenticate that they were at the home at specific points in time to provide this service. Further, when the authentication is done, automatic messages can be sent to the homeowner for example, notifying them, and possibly even initiating a conversation through the app where the homeowner can have some specific questions answered.

Solo-Example-3: Amazon™ (and now Publix™, through its "Instacart™") have scenarios where they deliver packages to homes, but the packages then get stolen. The app can be used by delivering vendors to authenticate that they did come to the home to deliver the package, and the app can trigger a real-time notification to the user. This can also minimize losses from stolen goods where the user may then be able to pick it up sooner than they otherwise may have. Once drivers leave the premises, even that can be verified with signatures through the app, so that homeowners later cannot complain that drivers lingered around longer than necessary or were responsible for other activities near the home.

Solo-Example-4: Taskrabbit™ is an application today where someone with a task finds a user online who is then "hired" to do this task. Some of these tasks require that the user be at a specific place at a particular time, but currently there is no method to prove this. For example, in a Yelp™ example, the company might pay thousands of users hired from a marketplace such as Taskrabbit™ to go to restaurants and submit official reviews. However those users can turn in reviews without having their location authenticated. This app will allow a user to prove that they were at the restaurant, for example, at a specific point in time prior to their submitting their review. In this example, this entire functionality can be integrated into an official Yelp™ app, by using APIs (Application Programming Interfaces) that the app disclosed herein provides. In this manner many third party apps can use the functionality described herein without actually having individual users to download the app, which is important for ensuring ease of use in existing applications.

(b) Parent-Child Mode.

In this mode the software keeps track of users and their relationships, where some users are coded as "parents" while others are coded as "children", with a many-to-many mapping between parents and children. The system provides all the functionality needed for parents and children to self-configure into this network. The system can also create this network automatically from a database. For example, if a school goes on a field trip and had a listing of chaperones, and students assigned to each chaperone, the system can automatically create parent-child relationships based on this data. From a technical perspective such systems in the past have also been called "master-slave" architectures.

In the Parent-Child mode authentication is driven by the parent, who sends a notification to the child to authenticate herself. In this mode the message could either be a sentence to be read (e.g. "say: The sky is blue today") or a question to be answered (e.g. "answer: Did you finish seeing the Mummy exhibit?"). The child then talks into the mobile device, where again the app hashes the spoken voice, the time/date information and location information from the mobile device to create a digital signature and used subsequently for authentication.

Parent-Child Example 1: Field-trip use cases such as the one noted above, where teachers/chaperones efficiently keep track of children with a dashboard showing them the ones who may not have responded yet. Note that locations claim are unforgeable, and provable as well.

Parent-Child Example 2: There is currently a popular app used by parents to keep track of their children called "Life 360". The Life 360 app does not have voice-based authentication, and also can be fooled using an app that can reset a phone's GPS location artificially. This disclosure provides a more reliable method to authenticate children, where parents use the functionality to ask their children to authenticate themselves at specific points in time (e.g. when they have reached a party, or when they are at their friend's house, etc.).

Parent-Child Example 3: Law enforcement nationally today uses technologies such as ankle bracelets to track certain (potentially dangerous) individuals. Ankle bracelets are unfortunately known to fail, and there have been several cases recently where this has been reported online as evidence by internet searches for "ankle bracelet failure". This disclosure can be used as an effective and cheap fall-back option for law enforcement to authenticate the location of these individuals. In this scenario, individuals needing to be tracked will have to install the client version of this app on their mobile device (or they can be provided a cheap mobile device with the app installed). Law enforcement then can send them messages at times when the individuals need to be authenticated. When the individuals read the message out loud, again the voice+location+date/time is hashed, encrypted and used as a means to authenticate this individual. Potentially this authentication can also be triggered by an "artificial parent" which is really a software program. In this case, when the program detects that a bracelet is not transmitting information it can automatically initiate this parent-child authentication request, thereby providing an important fall-back for a critical tracking application today.

Parent-Child Example 4: SAT, GRE, GMAT and other standardized tests have an important problem which is to authenticate the individual who takes the standardized test. As more and more students take these tests at international test centers, fail-proof authentication remains elusive. Recently "The Atlantic" wrote about this problem: https://www.theatlantic.com/education/archive/2016/03/how-sophisticated-test-scams-from-china-are-making-their-way-into-the-us/474474/.

This disclosure can be used at the test site, where the organization conducting the test sends a message using the app to the individual who is supposed to be the test-taker. Even if individuals fake a physical ID like a driver license, since the voice will be recorded and stored, it will be possible subsequently to check if the test was taken by an individual other than the person who is supposed to take it.

(c) Ambient Mode.

There may be authentication scenarios where a user may want to authenticate not just her location, but the environment around her. In domestic assault cases for instance, there are examples where a spouse illegally enters a home and assaults the other. In cases like this, a user may use an option on the app for "ambient authentication" where the system periodically (every few seconds) records the voices/sounds, creates a hash with this information coupled with date/time and location, and stores it, or forwards it to law enforcement, as the case may be. The example used here is self-explanatory and serves to be the main type of use-case for ambient authentication.

3. Other Unique Features

There are many other unique features of this disclosure, noted below.

(a) Fraud scores. If users try to fake the system, the embodiments herein have specific ways to detect it and compute "fraud scores" that are stored, which can then be used to deny authentication. Computing the fraud scores may be accomplished in different ways, using the delay between a message appearing on a phone and the voice recorded, using information from the phone to possibly indicate GPS spoofing, and to detect patterns in the voice signal that may suggest that this is not a spoken voice from a human, but a voice that is coming out instead from an electronic speaker. This is important since it otherwise may be possible for an adversary to sit at a remote location, use a camera/speaker to see information coming to a mobile device elsewhere and try and authenticate remotely without actually being at the location in question. Being able to detect that the voice captured came from an electronic device and not a real human can prevent this adversary from being authenticated.

(b) API-based functionality and White Labeling. Individual components of this functionality are being made available as APIs so that they can be called by existing apps. For instance, Amazon™ or Publix™ may have their own app currently that is being used by individuals who are delivering products. The embodiments of this disclosure are designed to be able to easily provide authentication functionality directly into their apps, by using APIs. Further, any of the apps can be "white labeled" so the company providing the app can customize the functionalities in any manner that is desired.

A system embodiment of this disclosure authenticates an individual's location activity and includes at least one mobile communications device connected to a network and in electronic communication with at least one other computer, such as a server utilizing cloud based memory. The mobile communications device includes at least a processor, memory connected to the processor, and software stored in the memory. The software is configured to authenticate the individual's presence at a location using biometric data entered by the individual as an input into the mobile communications device. The input is usually a response to a request sent from the other computer or server. To complete a response, the mobile device utilizes an app to access location information for the mobile communications device using a GPS application stored on the mobile communications device, to access time information for the mobile communications device from a clock application stored on the mobile communications device. Using this response information the app creates a digital signature that authenticates an individual's location activity by storing an encrypted digital certificate. The digital certificate includes a hash calculation using the biometric data, a validation key generated by authenticating the biometric data, the location information, and the time information. In at least one embodiment, the biometric data is voice data, and authenticating the voice data includes accessing a voice authentication application on the mobile communications device. The voice authentication application may access a pre-recorded voice sample saved in a mobile device memory. In another non-limiting embodiment, the voice authentication application is in electronic communication with a remote server processing voice authentication services, and the voice authentication services access a pre-recorded voice sample of the individual using the mobile communications device.

The digital signature is an encrypted digital signature, and this disclosure includes a method of authenticating use of a mobile computerized device with the digital signature. In one embodiment, the method includes connecting the computerized device across a network to a server configured with an authentication protocol programmed in software on the server; using the authentication protocol to send a communication to the mobile device, the communication structured to elicit a response back from the mobile device; receiving a response back from the mobile device; and storing the response in memory on the server.

The method continues by providing audio or video content data from the mobile device back to the server in the response. Sending the response further includes providing location data from the mobile device back to the server in the response and providing time data from the mobile device back to the server in the response. A hashing algorithm is applied to the response at the mobile device prior to transmitting the response back to the server and using a hashed response to encrypt the response for verification at the server. In one non-limiting embodiment, the mobile device is accessing the hashing algorithm by sending the response to the server through an application program interface stored on the mobile device.

Additional details of this disclosure supported in the claims below and the associated figures.

The invention claimed is:

1. A system for authenticating an individual's location activity, comprising:
    a mobile communications device connected to a network and in electronic communication with authentication protocol software stored on a server connected to the network;
    using the authentication protocol software to send a communication to the mobile device, the communication comprising a message configured to elicit a response comprising a same message back from the mobile device;
    the mobile communications device comprising a processor, memory connected to the processor, and additional software stored in the memory configured to:
    receive the communication from the server and receive the same message entered into the mobile device by the individual;
    receive biometric data entered by the individual as an input into the mobile communications device;
    access location information for the mobile communications device using a GPS application stored on the mobile communications device;
    access time information for the mobile communications device from a clock application stored on the mobile communications device;
    periodically record sounds from an environment around the mobile communications device, wherein the sounds are not biometric data entered by the individual;
    storing on the mobile communications device an encrypted digital certificate comprising a hash calculation using the response, the sounds, the biometric data, a validation key, the location information, and the time information;
    transmitting the digital certificate to the authentication protocol software and verify the encrypted digital certificate at the server with the validation key.

2. A system according to claim 1, wherein the biometric data is voice data.

3. A system according to claim 2, wherein verifying the voice data comprises accessing a voice authentication application on the mobile communications device or on the server.

4. A system according to claim 3, wherein the voice authentication application comprises a pre-recorded voice sample.

5. A system according to claim 3, wherein the voice authentication application is in electronic communication with a remote server processing voice authentication services, and wherein the voice authentication services access a pre-recorded voice sample of the individual created using the mobile communications device.

6. A system according to claim 1, further comprising forming an encrypted digital signature for the individual's location activity after verifying the digital certificate at the server.

7. A system of claim 1, further comprising providing audio or video content data from the mobile device back to the server in the response.

8. A system of claim 1, further comprising accessing a hashing algorithm with the mobile communications device through an application program interface stored on the mobile communications device.

* * * * *